United States Patent [19]

Beatson et al.

[11] 4,146,875

[45] Mar. 27, 1979

[54] PRESSURE SENSING DEVICE

[75] Inventors: Michael F. F. Beatson, Florence, Italy; Terence M. Nunn, Dover, England

[73] Assignee: Scotus Marine Limited, London, United Kingdom

[21] Appl. No.: 810,456

[22] Filed: Jun. 27, 1977

[51] Int. Cl.$^2$ .................. G01L 9/08; G01L 15/00; H01L 41/10
[52] U.S. Cl. .................. 340/191; 73/4 R; 73/720; 73/781; 310/338
[58] Field of Search ............ 340/191; 73/4 R, 194 B, 73/398, 419, 194 E, 100, 103, 4; 324/71 R; 310/311, 314, 318, 319, 338, 348, 354

[56] References Cited

U.S. PATENT DOCUMENTS

| 3,942,049 | 3/1976 | Hyanova et al. | 310/338 |
| 4,012,940 | 3/1977 | Change et al. | 73/4 R |

FOREIGN PATENT DOCUMENTS

| 1008627 | 11/1965 | United Kingdom. |
| 1020356 | 2/1966 | United Kingdom. |

Primary Examiner—Donald J. Yusko
Attorney, Agent, or Firm—Sughrue, Rothwell, Mion, Zinn and Macpeak

[57] ABSTRACT

A pressure sensing device comprising a ring surrounding or adapted to surround a body subjected to internal pressure; means to connect the ring physically to the body at spaced locations, the connecting means transmitting to the ring dilation and contraction movements of the body due to variation of pressure therein; said movement transmitted by the connecting means causing a portion of the ring between adjacent spaced locations to flex elastically in the manner of a bending beam, and an electrical transducer mounted upon said flexing portion of the ring, to produce electrical signals dependent on the pressure variation. One form of the device is adapted to clamp around an engine fuel line to sense fuel pressure. Another form of the device is adapted to measure engine cylinder pressure. In a further development of the invention these two forms of device are combined to feed information to engine analysing circuitry producing a visual display.

12 Claims, 14 Drawing Figures

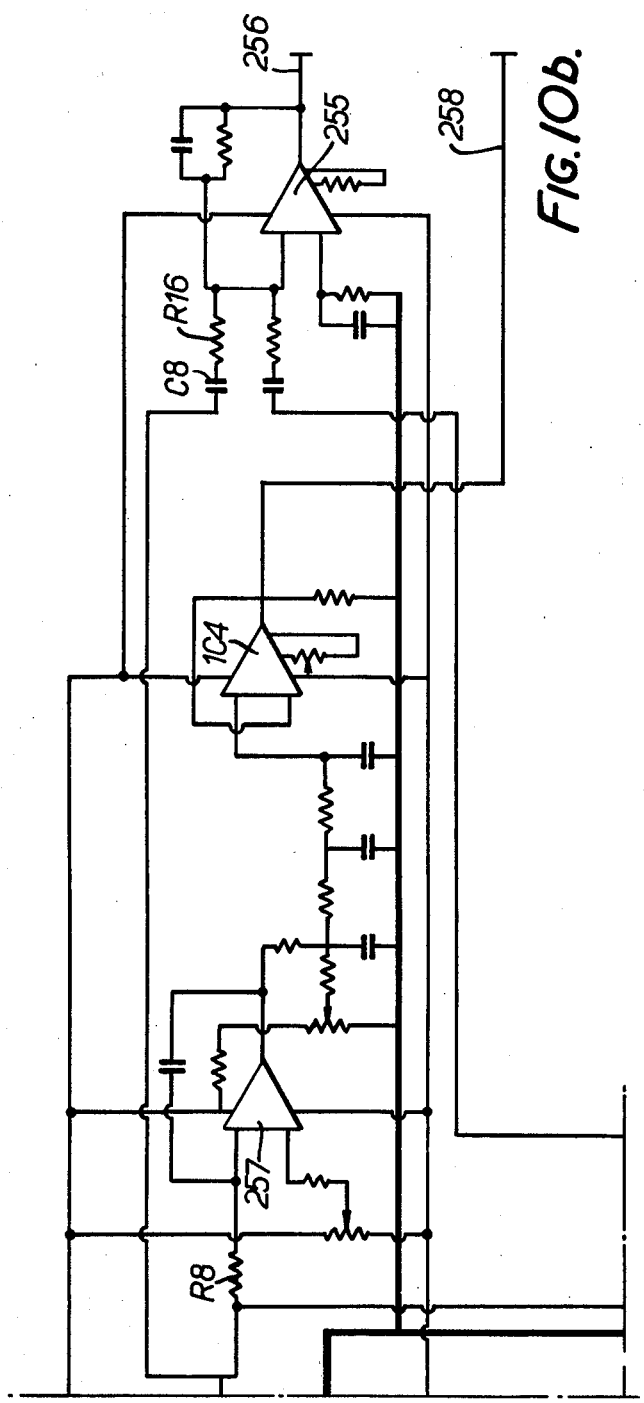

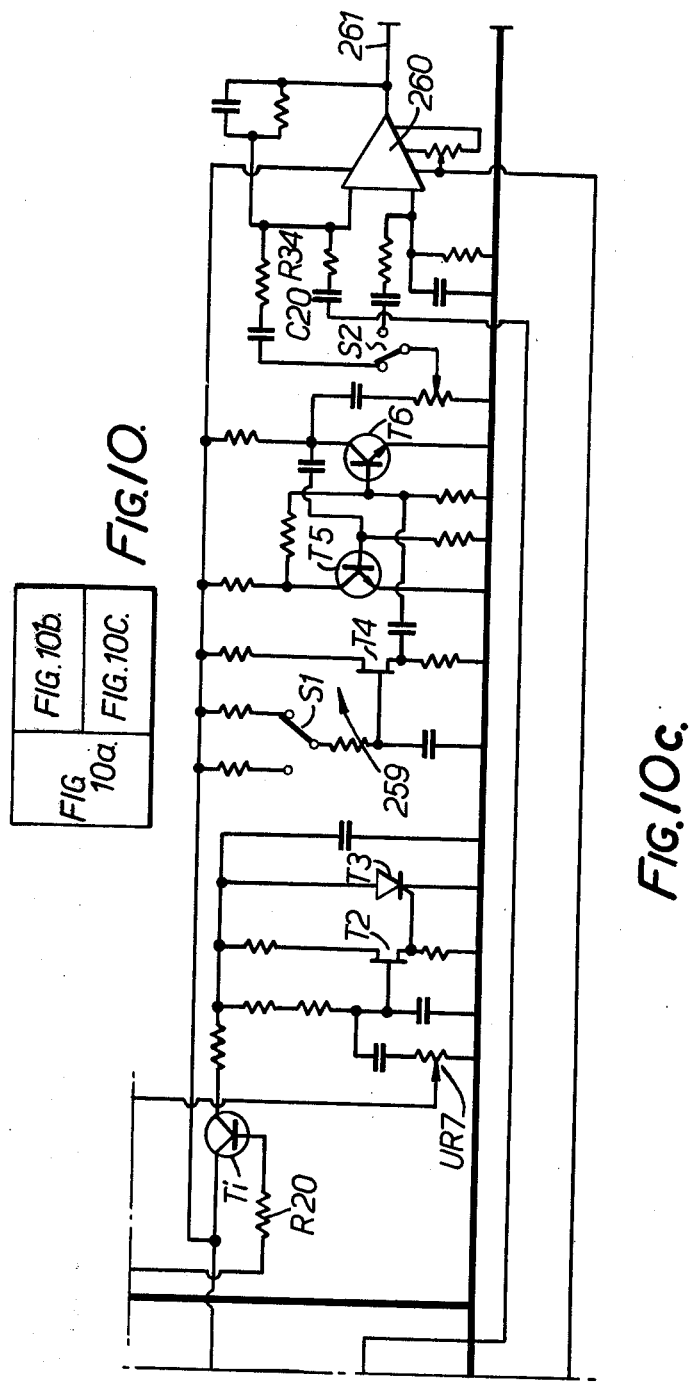

PRESSURE SENSING DEVICE

BACKGROUND OF THE INVENTION

This invention relates to pressure sensing devices, more especially but not exclusively for use in analysing the performance of internal combustion engines. The invention includes also engine analysing apparatus.

SUMMARY OF THE INVENTION

The invention provides a pressure sensing device comprising: a ring surrounding or adapted to surround a pressure line or vessel; means connecting or adapted to connect the ring physically to the line or vessel at spaced locations; the connecting means transmitting to the ring dilation and contraction movements of the pressure line or vessel due to variation of pressure therein; said movement transmitted by the connecting means causing a portion of the ring between adjacent spaced locations to flex elastically in the manner of a bending beam, and an electrical transducer, mounted upon said flexing portion of the ring, to produce electrical signals dependent on the pressure variation.

Preferably said transducer is a piezoelectric crystal.

It is preferred that the ring provides at least two opposed symmetrical portion to flex elastically in the manner of a bending beam, and similar transducers are mounted symmetrically one on each said flexing portion. The transducers can be electrically combined to reinforce the signals and cancel out most of the noise.

In a pressure sensing device according to the invention for use with a pressure line, preferably the mounting means comprise threaded elements disposed symmetrically with respect to and threadedly engaging the ring to bear on opposite sides of the pressure line.

The invention also provides, in combination with a pressure vessel, a device as above defined, the vessel providing a pressure fluid chamber symmetrically placed on a diameter of the ring, with vessel, ring and connecting means integrally formed, the latter extending generally diametrically.

For the purpose of engine performance analysis, the invention provides a combination of the devices mentioned in the foregoing two paragraphs, the first to sense fuel line pressure, the second to sense cylinder pressure; the apparatus further comprises a display device, and signal processing means accepting signals from said first and second devices to control the display device to display the fuel line pressure and the cylinder pressure, timing marks representing engine crank or piston position.

BRIEF DESCRIPTION OF THE DRAWINGS

Embodiments of the invention will now be described by way of example, with reference to the accompanying drawings, in which.

DESCRIPTION OF PREFERRED EMBODIMENT

Figure 1:
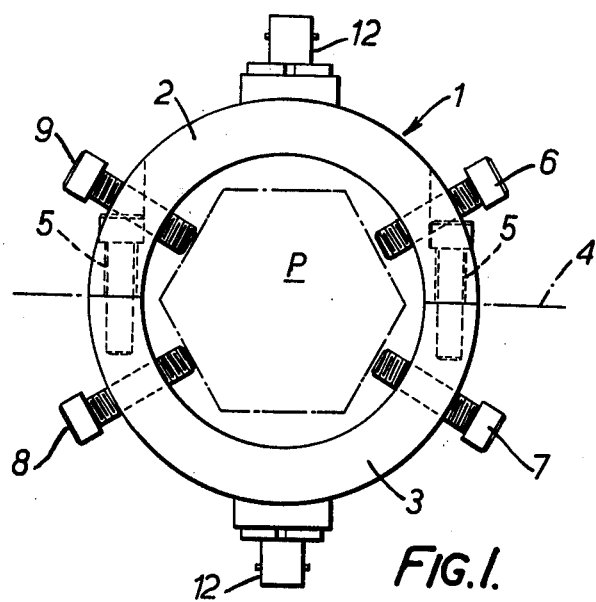
FIG. 1 is an end view of the device for sensing pressure in a fuel line, the device being shown mounted on a pipe union.
Figure 2:
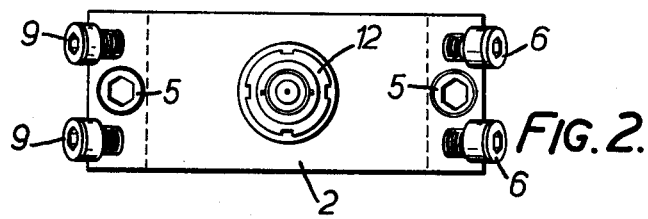
FIGS. 2 and 3 are side elevations of the FIG. 1 device from directions at right angles to one another.
Figure 3:
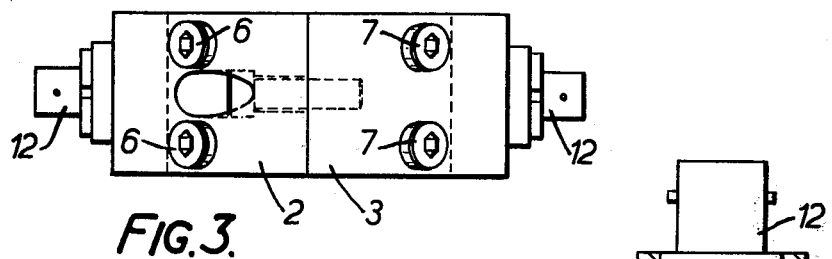
Figure 4:
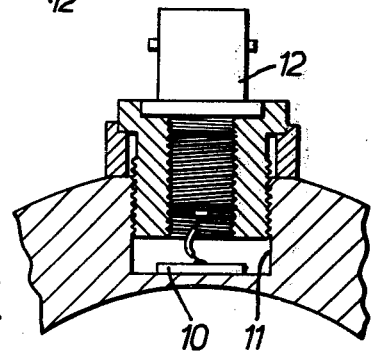
FIG. 4 is an enlarged sectional view showing a transducer mounted in the device.
Figure 5A:
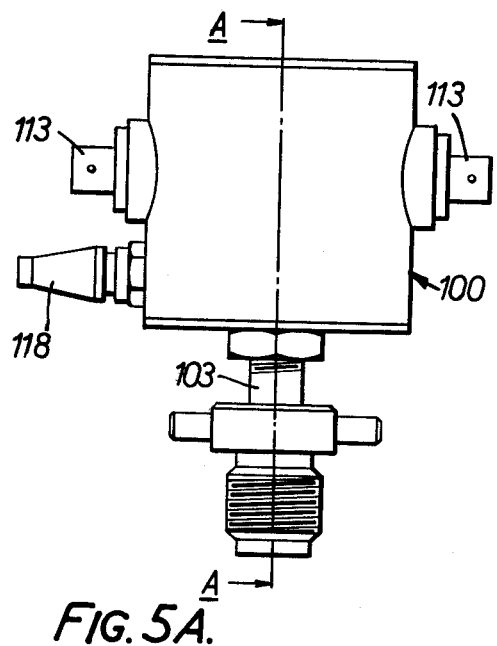
FIGS. 5A and 5B are side elevations, seen at right-angles to one another, of a cylinder pressure sensing device.
Figure 5B:
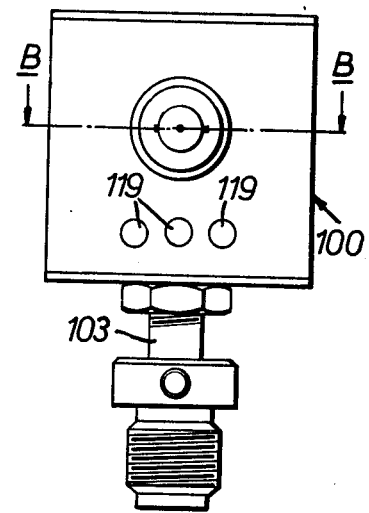
Figure 6:
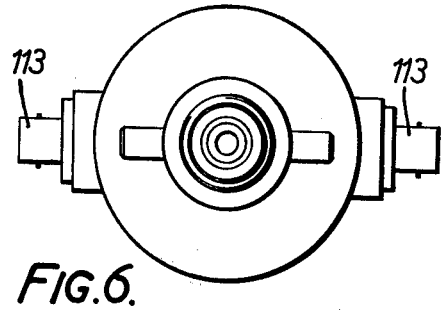
FIG. 6 is a bottom plan view of the device of FIGS. 5A and 5B.
Figure 7:
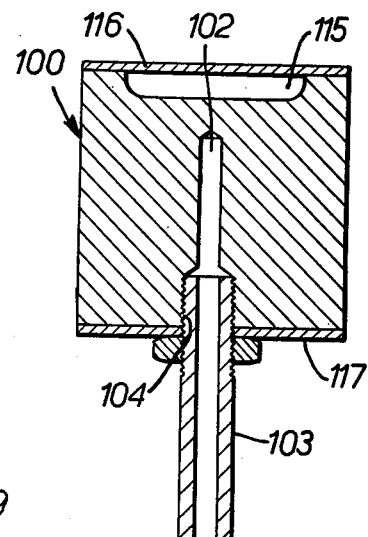
FIGS. 7 and 8 are sectional views of the device taken respectively on the lines A—A and B—B shown in FIGS. 5A and 5B, and FIGS. 9 and 10, 10a, 10b and 10c are circuit diagrams of apparatus for analysing engine performance, the apparatus incorporating both the device of FIGS. 1 to 4 and that of FIGS. 5A to 8.
Figure 8:
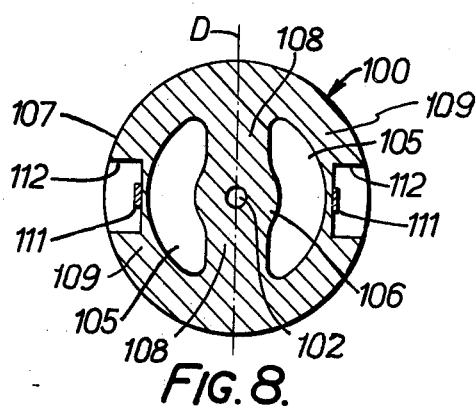

Referring to the drawings, the fuel line pressure sensing device of FIGS. 1 to 4 comprises a ring 1 made in two halves 2, 3 mating on a diametral plane 4 and secured together by bolts 5. The ring 1 is shown assembled about a pipe union P in a fuel line. Four pairs of screws 6, 6, 7, 7, 8, 8, 9, 9 threadedly engage the ring and are tightened to engage flats on the union. The centre lines of screws 6, 7 on the one side, and of the screws 8, 9 on the other, define 60° angles which are bisected by the plane 4.

Identical transducers 10 are mounted symmetrically one in each half of the ring. Each transducer 10 is a ceramic piezoelectric crystal element in the form of a disc and is cemented to the flat bottom of a bore 11 in the respective half of the ring, the bores being aligned on an axis perpendicular to the plane 4. A connector 12 is threaded into each bore and connected to a lead 13 from the respective crystal unit.

It will be seen that the two halves 2, 3 of the ring are thus each a mirror image of the other, about the plane 4, and that each half is also symmetrical about the dimetral plane perpendicular to the plane 4.

As the pressure line union P dilates and contracts due to pressure variations, the two halves 2, 3 of the ring flex symmetrically in the manner of bending beams, and this movement is sensed by the transducers 10 which give corresponding electrical signals. The transducers are connected so that unwanted components of the signals tend to cancel out and the pressure dependent components to reinforce one another. The pressure dependent signals can be displayed on an oscillograph, and recorded photographically if desired. Apparatus for doing this is described later. It will be appreciated that the fuel pressure variations provide a valuable indication of the function of the injector which the fuel line supplies, and also, in conjunction with crank angle information, of the timing of the fuel injection.

However, the device of FIGS. 1 to 4 can also be used for high pressure lines of various kinds; the arrangement of screws 6, 6, 7, 7, 8, 8, 9, 9 can be adapted to suit whatever exterior shape the device has to be clamped on.

The piezoelectric elements can be replaced by impedance strain gauges.

FIGS. 5A to 8 illustrate a device for sensing pressure of an engine cylinder.

The device of FIGS. 5A to 8 comprises a cylindrical block shown generally at 100 which is formed with an axial bore closed at its upper end and providing a pressure chamber 102. A thick-walled tube 103 is threadedly engaged in a counterbore 104 and provides communication between the chamber 102 and an engine cylinder. The block 100 is formed with symmetrical through passages 105 which are generally segmental as seen in plan. By reason of these passages 105 the block 100 can be regarded as defining a central member or pressure vessel 106 containing the chamber 102, a ring 107 coaxial therewith, and elements 108 connecting the central member to the ring, these elements being aligned on a diameter D. Pressure in the chamber 102 causes expansion of the central member 106 which is transmitted to the ring 107 to cause flexing of the two portions 109 thereof which are symmetrical about the diameter D.

An electrical transducers 111 in the form of a disc-like piezoelectric crystal element is cemented to the flat bottom of a bore 112 in each of the ring portions 109, the bore 112 being similar and aligned on a diameter perpendicular to the diameter D. Each transducer 111 is connected to a connector 113 (shown in FIGS. 5A, 5B and 6 but not in FIG. 8).

As the central member 106 dilates and contracts due to variations in pressure within the chamber 102, the two portions 109 of the ring 107 flex symmetrically in the manner of bending beams, and this movement is sensed by the transducers 111 which give corresponding electrical signals. The transducers are connected so that unwanted components of the signals tend to cancel out and the pressure dependent components to reinforce one another. The pressure dependent signals can be displayed on an oscillograph, and recorded if desired. Apparatus for this will be described below.

A recess 115 is formed in the upper end of the block 100, and upper and lower ends are covered by plates 116, 117. An air inlet is provided at 118 to admit cooling air to one of the segmental passages 105 near the bottom plate 117. Cooling air passes up this passage, across the recess 115 and down the other passage, to air exit holes 119. Thus in spite of high temperatures within the chamber 102, the ring portions 109 can be kept at a low enough temperature to avoid damage to the transducers. The device can be connected to an engine cylinder with very little connecting volume, so that the pressure in the chamber can follow accurately that in the cylinder.

The device can be used for measurement of high and fluctuating pressures from sources other than engine cylinders.

The cylinder pressure sensing device just described may with advantage be combined with the device for sensing fuel pressure described with reference to FIGS. 1 to 4, in engine performance analysing apparatus illustrated in FIGS. 9 and 10.

Figure 9:
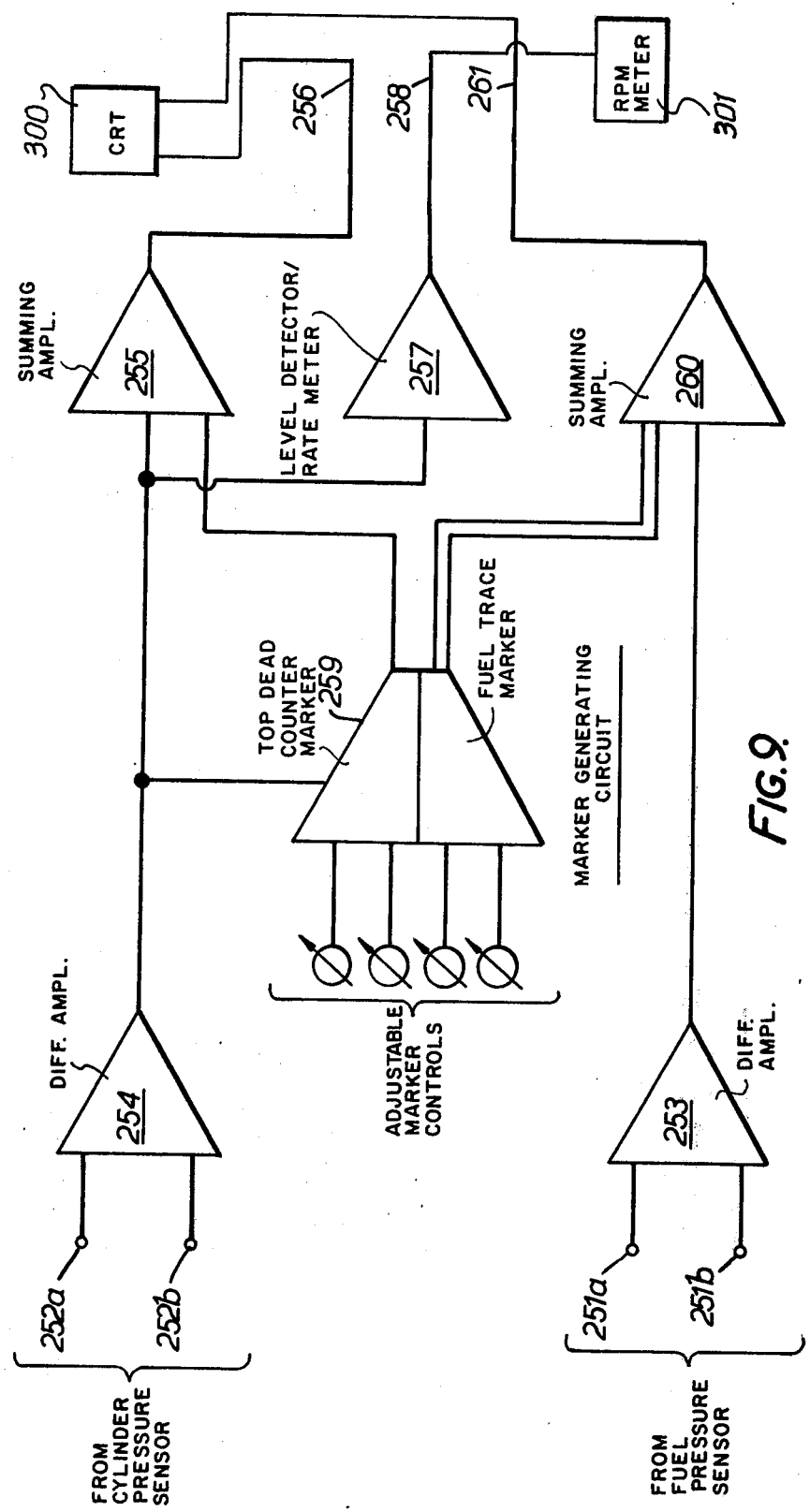
Figure 10A:
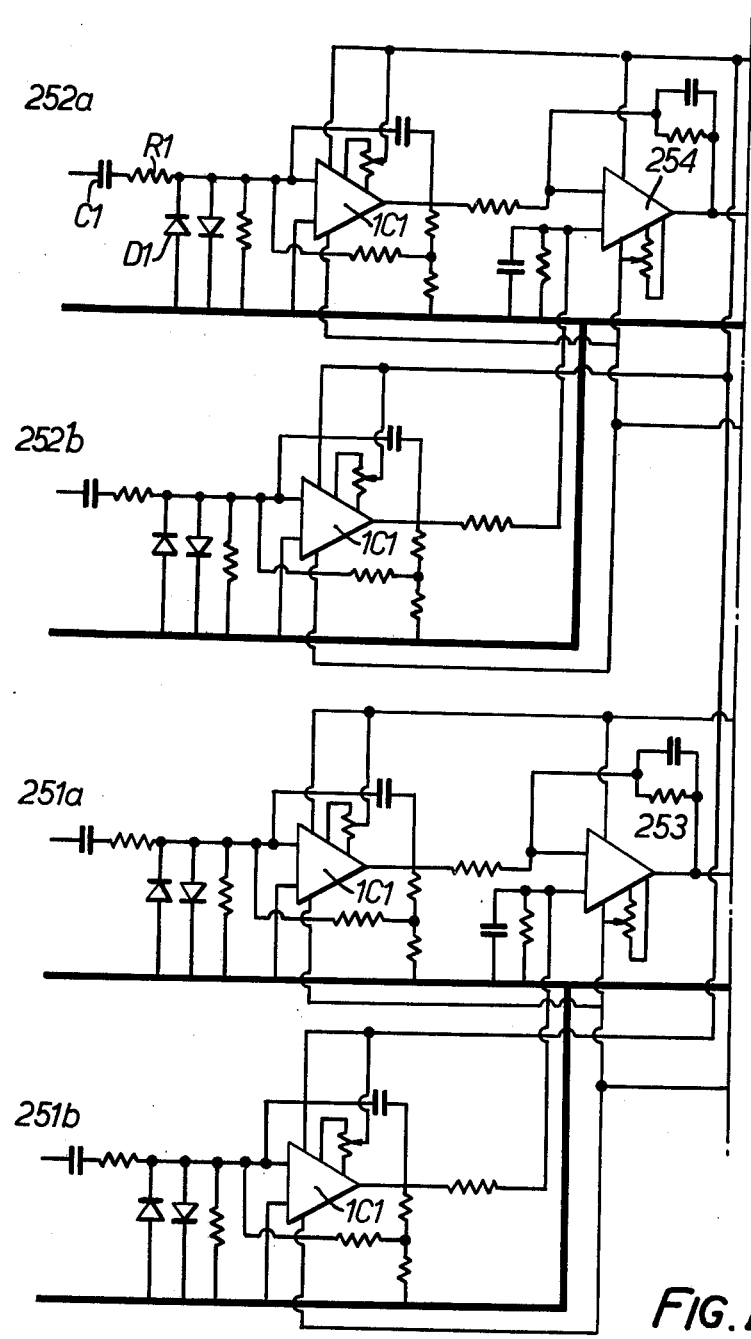

The analysing circuit is shown diagrammatically in FIG. 9 and in more detail in FIG. 10. High impedance input from the crystals of the fuel pressure sensing device and the cylinder pressure sensing device are shown at 251a, 251b and 252a, 252b respectively. As seen in FIG. 9, each pair of inputs is fed to a differential amplifier 253, 254 respectively wherein noise signals, being 180° out of phase, are cancelled out and pulses due to fuel or cylinder pressure are reinforced. As will appear from FIG. 10, each input is fed through an amplifier 1C 1 which can be a field effect transistor input silicon monolithic integrated circuit (FET-1C). The components C1, R1, D1, serve to protect the amplifier 1C 1, during plug-in, from any high voltage that may have built up in the respective transducer.

At the output of the cylinder pressure differential amplifier 254 the signal divides. One path (via C8 and R16 in FIG. 10) feeds the summing amplifier 255 which drives the upper channel 256 of a dual channel cathode ray oscilloscope 300. Another path from amplifier 254 (via R8 in FIG. 10) feeds a squaring circuit 257 to produce a pulse train.

The level detector 257 (through buffer amplifier 1C4 in FIG. 10) provides an analogue pulse train signal for a digital R.P.M. meter 301 for which a connection is shown at 258. The output from the amplifier 254 is also connected (through transistor switch Ti, FIG. 10) to one section of a marker generator circuit 259 which will be seen from FIG. 10 to comprise a unijunction transistor (UJT) T2 and silicon controlled rectifier T3.

A timed pulse is fed via UR7 to the cylinder pressure summing amplifier 255. This pulse is used as a top dead centre marker.

The output of the fuel pressure differential amplifier 253 is fed straight to a fuel summing amplifier 260 (via C20 and R34, FIG. 10). Timed marker pulses are also fed to this summing amplifier 260 from a second section of marker circuit 259 in order that measurements may be taken on photographs of the traces. For accuracy two timed markers are available depending upon the position of timer switch S1, that required being selected by gauged switch 51, 52 and being generated by the U.J.T. T4 and shaped by T5 and T6 (FIG. 10). So that confusion does not arise over which timed markers are in use, those intended for high speed operation are inverted by connecting them to the inverting input of amplifier 260 by suitably positioning the inverting switch S2. The output of the summing amplifier 260 is taken to the second or lower channel 261 of the dual channel oscilloscope.

It will be noted that FIG. 10 for convenience is shown in three parts 10a, 10b, 10c which fit together as shown in the diagram above FIG. 10c.

An important feature of the pressure sensing means herein described is the arrangement of the ring so that portions bend in the manner of a bending beam. This provides for considerable flexibility in design, as given an expected pressure range a desired strain for a particular piezoelectric crystal can readily be obtained by appropriate dimensioning of the parts.

What is claimed is:

1. A pressure sensing device comprising
a ring surrounding or adapted to surround a body subjected to internal pressure;
means to connect the ring physically to the body at spaced locations, the connecting means transmitting to the ring dilation and contraction movements of the body due to variation of pressure therein, the ring being free of the body between said spaced locations to define beam portions;
said movement transmitted by the connecting means causing said beam portions of the ring to flex elastically in the manner of a bending beam, and
an electrical transducer, mounted upon at least one of said beam portions of the ring, to produce electrical signals dependent on the bending of said beam portion and hence on the pressure variation.

2. A device as claimed in claim 1, wherein said transducer is a piezoelectric crystal.

3. A device as claimed in claim 1, wherein
the ring provides at least two opposed symmetrical portions to flex elastically in the manner of a bending beam, and
similar transducers are mounted symmetrically one on each said flexing portion.

4. A pressure sensing device for a pressure line comprising
a ring adapted to surround the pressure line;
means to connect the ring symmetrically to the line at spaced locations;
the connecting means transmitting to the ring dilation and contraction movements of the pressure line due to variation of pressure therein;

said movement transmitted by the connecting means causing at least two opposed symmetrical beam portions of the ring to flex elastically in the manner of a bending beam, and similar transducers mounted symmetrically one on each said beam portion to produce electrical signals dependent on the bending of said beam portions and hence the pressure variation.

5. A device as claimed in claim 4 wherein the mounting means comprise threaded elements disposed symmetrically with respect to and threadedly engaging the ring to bear on opposite sides of the pressure line.

6. A device as claimed in claim 5 wherein pairs of threaded elements are disposed radially at 60° on each side of the ring to bear upon opposed hexagon flats of a pipe union.

7. A device as claimed in claim 6, wherein the ring is diametrally divided in a manner symmetrical with regard to the threaded elements each half of the ring providing one said flexing portion.

8. A pressure vessel having means to sense the pressure therein comprising a ring surrounding the pressure vessel;

means connecting the ring physically to the vessel at spaced locations and defining two opposed symmetrical beam portions between said spaced locations, the connecting means transmitting to the ring dilation and contraction movements of the pressure vessel due to variation of pressure therein;

said movement transmitted by the connecting means causing said beam portions to flex elastically in the manner of a bending beam, and similar transducers mounted symmetrically one on each said beam portion to produce electrical signals dependent on the bending of said beam portions and hence on the pressure variation.

9. A pressure vessel as claimed in claim 8, wherein the vessel provides a pressure fluid chamber symmetrically placed on a diameter of the ring, the vessel, ring and connecting means are integrally formed, and the latter extends generally diametrally.

10. A pressure vessel as claimed in claim 8, wherein segmental spaces within the ring are provided with connections for cooling fluid.

11. A device as claimed in claim 8 wherein the ring is cylindrical, the pressure chamber is coaxial with the ring and has an endwise connection.

12. Engine analysing apparatus comprising a first pressure sensing device for the engine pressure fuel line the first device comprising a ring adapted to surround the fuel line;

means to connect the ring physically to the line at spaced locations the connecting means transmitting to the ring dilation and contraction movements of the pressure line due to variation of pressure therein;

said movement transmitted by the connecting means causing a portion of the ring between adjacent spaced locations to flex elastically in the manner of a bending beam, and an electrical transducer mounted upon said flexing portion of the ring, to produce electrical signals dependent on the pressure variation;

a second pressure sensing device for an engine cylinder the second device comprising a ring surrounding a pressure vessel adapted to be put in communication with the engine cylinder;

means connecting the ring physically to the vessel at spaced locations the connecting means transmitting to the ring dilation and contraction movement of the pressure vessel due to variation of pressure therein;

said movement transmitted by the connecting means causing a portion of the ring between adjacent spaced locations to flex elastically in the manner of a bending beam, and an electrical transducer mounted upon said flexing portion of the ring, to produce electrical signals dependent on the pressure variation:

a display device: and signal processing means accepting signals from the transducers of both first and second pressure sensing devices to control the display device to display
(a) the fuel line pressure,
(b) the cylinder pressure and
(c) timing marks representing engine crank position.

* * * * *